United States Patent Office 3,370,045
Patented Feb. 20, 1968

3,370,045
POLYESTERS AND POLYURETHANE FOAMS FROM DI- AND TRI-(BETA-CARBOXYETHYL) ISOCYANURATES AND PROCESS FOR PREPARING THEM
Alexander Sadle, Petersburg, Va., assignor to Allied Chemical Corporation, New York, N.Y., a corporation of New York
No Drawing. Continuation-in-part of application Ser. No. 814,671, May 21, 1959. This application Dec. 11, 1963, Ser. No. 329,866
5 Claims. (Cl. 260—75)

This invention relates to new polyester resins and to polyurethane products prepared therefrom.

This application is a continuation-in-part of my application Serial No. 814,671 filed May 21, 1959, now U.S. Patent No. 3,235,553.

In the above application there are described di- and tri-(beta-carboxyethyl)isocyanurates and their esters which are prepared by hydrolyzing di- and tri- beta-cyanoethyl isocyanurates to the beta-carboxyethyl derivatives which can then be esterified with alcohols to form the corresponding esters.

In accordance with the present invention the di- and tri-(beta-carboxyethyl)isocyanurates or their lower alkyl esters are reacted with polyhydric alcohols to produce useful polyesters. The resulting polyesters are useful in the preparation of fibres and as coating resins. The new polyesters are also useful as starting material in reactions with organic diisocyanates for the production of polyurethanes, particularly rigid urethane foams suitable for thermal and structural insulation. It is, therefore, a feature of the present invention to provide new polyurethane products and a process for preparing them by reacting di- and tri-(beta-carboxyethyl) isocyanurate or a lower alkyl ester thereof with a polyhydric, preferably dihydric, alcohol having from 2 to 12 carbon atoms, and reacting the resulting polyester with an organic diisocyanate.

In carrying out the process according to my invention the di- and tri-(beta-carboxyethyl)isocyanurates as described in my parent application above referred to or their lower alkyl esters are condensed with polyhydric alcohols, particularly with alkylene glycols, or di- or tri-alkylene glycols containing from 2 to 12 carbon atoms.

The reaction of a glycol with di-(beta-carboxyethyl) isocyanurate or a lower alkyl ester thereof produces a linear polyester consisting of the following repeating units,

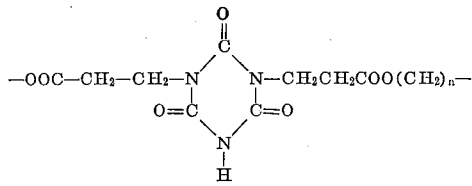

and terminal hydrogen, hydroxyl, glycol or carboxyethyl isocyanurate units.

Reaction of a polyhydric alcohol with tri-(beta-carboxyethyl)isocyanurate, or ester thereof, produces a polyester which may be either linear or cross-linked, and whose composition will vary with proportions of reactants used and with reaction conditions.

The condensation reaction is carried out by heating the reactants at elevated temperatures, for example, between about 180° C. and about 240° C., and in the case of the lower alkyl esters of di- and tri-(beta-carboxyethyl)isocyanurates, preferably in the presence of a trans-esterification catalyst such as antimony trioxide ($Sb_2O_3$) lead oxide (PbO), tin caprylate, zinc caprylate or lead naphthenate. Suitable polyhydric alcohols which form polyesters with di- and tri-(beta-carboxyethyl)isocyanurate include the alkylene glycols, such as ethylene glycol, propylene glycol, butadiol -1,4 or -1,2, pentamethylene glycol, hexamethylene glycol, decamethylene glycol and dodecamethylene glycol, as well as diethylene glycol, glycerol, polyethylene glycols, etc.

The resulting polyesters are characterized by excellent adhesion to metal and other substrates and have high flexibility and toughness when applied as coating compositions. They are also resistant to elevated temperatures and thus are suitable for laminating metals and asbestos sheets and for impregnating glass cloth and asbestos tapes.

In accordance with another embodiment of my invention, the above polyesters are converted into polyurethanes by reaction with organic diisocyanates and particularly into rigid foams by such reaction, preferably using the customary additives for such reactions; namely, a catalyst such as an organic amine, water and a foaming agent such as a surface active agent, including the alkyl sulfates and sulfonates, alkyl aryl sulfonates, fatty acid amides, alkyl amido sulfates, alkyl aryl polyether alcohols, etc. Water may be omitted and a gaseous blowing agent such as a fluorocarbon may be used instead of the in situ generated $CO_2$ produced by contact of water with an excess of diisocyanate.

The organic diisocyanates generally may be employed in this reaction, including 4,4'-diphenyl diisocyanate, 4,4'-diphenylene methane diisocyanate, di-anisidine diisocyanate, 4,4'-toldene diisocyanate, 1,5-naphthalene diisocyanate, 4,4'-diphenyl ether diisocyanate, p-phenylene diisocyanate, the meta tolylene diisocyanates such as 2,4- and 2,6-tolylene diisocyanates or mixtures thereof.

In preparing the foamed polyurethane, the polyester is mixed with between about 10 parts and about 50 parts of an organic diisocyanate, per 100 parts of polyester (parts are by weight). To this mixture may be added a small proportion of an amine catalyst, for example, between about 0.5 part and about 3 parts per 100 parts of polyester; between about 1 part and about 5 parts water and between about 0.5 part and about 5 parts of a surface active agent or detergent to function as a foaming agent.

The resulting rigid foams have many uses and are especially adapted for thermal insulation, as in refrigerators, etc.

The following specific examples further illustrate the invention:

Example 1

Tri-(beta-carboxyethyl)-isocyanurate, 1 mol, and hexamethylene glycol, 9 mols, were mixed and heated in the presence of 0.1% by weight of $Sb_2O_3$ at 180–200° C. at atmospheric pressure for seven hours. During the ester interchange which took place, 77% of the theoretical amount of ethanol was recovered, indicating production of the hexamethylene glycol polyester to at least about this extent. Next, 72.8% of the excess hexamethylene glycol was removed at 141° C./0.22 mm. Hg.

Fifty parts of the hexamethylene glycol polyester thus produced was mixed with 17 parts of toluene diisocyanates (Nacconate 80) and stirred. To this was added a solution containing 1 part of N-methyl morpholine (catalyst), 2 parts water, and 1 part of detergent. Foaming was almost instantaneous. The foam was heated in an oven for 45 minutes at 105° C. to complete the cure.

The finished foam was white, rigid and resistant to mechanical shock.

When the process of Example 1 is repeated employing di(beta-carboxyethyl)isocyanurate, 1 mol, and decamethylene glycol, 2 mols, a linear polyester is obtained suitable for use in coating and laminating compositions.

Example 2

Tri(beta-carboxyethyl)isocyanurate, 34.5 parts (0.10 mole) were mixed with 38.94 parts (0.33 mole) of hexamethylene glycol and heated at temperatures of 235° C. to 240° C. in a nitrogen atmosphere with stirring for about 11 hours. The reaction mixture was then allowed to cool overnight, when heating was resumed and continued for an additional 4 hours. At this point an acid number of 20.4 mg. KOH/gm. of sample indicated the acid groups were about 89% reacted. The resulting polyester was subjected to the following tests:

(1) Copper wire (A.W.G. 18 gauge, hand drawn) was coated with six layers of the polyester diluted with 50 volume percent cresylic acid. Each coat was cured at 240° C. for 4 minutes. The final product had an irregular but continuous coat.

(2) Substantially the same results were obtained with undiluted polyester.

(3) Steel panels were coated with the polyester diluted with 50 volume percent methyl Cellosolve acetate (2-methoxyethylacetate). The solvent was evaporated at 125° C. and then cured at 240° C. for one hour. The coating was flexible and showed perfect adhesion to the steel panels when subjected to the Gardner conical mandrel bent test (Serial No. 281). The film did not crack when subjected to both front and back impact tests.

Another steel panel coated in the same manner gave a Sward hardness value of approximately 12 and a standard pencil scratch of 4H. The coating did not flake off when attempts were made to pry the coating loose.

The polyester has excellent adhesion and flexibility. It is tough rather than hard. The polyester withstands moderately high temperature and is applicable for laminating metals and asbestos sheets as well as for impregnating glass cloth and asbestos tapes.

While the above describes the preferred embodiments of the invention, it will be understood that departures may be made therefrom within the scope of the specification and claims.

I claim:

1. A resinous polyester of tri-(beta-carboxyethyl)isocyanurate and a polyhydric alcohol.

2. A resinous polyester of tri-(beta-carboxyethyl)isocyanurate or a lower alkyl ester thereof and a polyhydric alcohol.

3. A resinous polyester of di-(beta-carboxyethyl)isocyanurate and a polyhydric alcohol.

4. A polymeric resinous polyester reaction product of a member selected from tris(beta-carboxyethyl)isocyanurate and lower alkyl esters thereof and a polyalkylene glycol containing from 2 to 12 carbon atoms inclusive.

5. A linear polymeric resinous polyester consisting of the following units

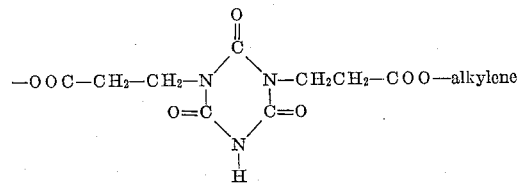

References Cited

UNITED STATES PATENTS

| | | | |
|---|---|---|---|
| 2,838,511 | 6/1958 | Kogon | 260—75 X |
| 3,061,591 | 10/1962 | Roth | 260—75 |
| 2,921,916 | 1/1960 | Harrison et al. | 260—2.5 |
| 3,054,760 | 9/1962 | Worsley et al. | 260—2.5 |

DONALD E. CZAJA, *Primary Examiner.*

H. S. COCKERAM, G. W. RAUCHFUSS, J. J. KLOCKO, *Assistant Examiners.*